US006225368B1

(12) United States Patent
D'Agostino et al.

(10) Patent No.: US 6,225,368 B1
(45) Date of Patent: May 1, 2001

(54) WATER BASED GRAFTING

(75) Inventors: Vincent F. D'Agostino, Dix Hills, NY (US); John Michael Newton, Corsham (GB)

(73) Assignee: National Power PLC, Wilts (GB)

( * ) Notice: Subject to any disclaimer, the term of this patent is extended or adjusted under 35 U.S.C. 154(b) by 0 days.

(21) Appl. No.: 09/391,251

(22) Filed: Sep. 7, 1999

Related U.S. Application Data

(63) Continuation-in-part of application No. 09/153,458, filed on Sep. 15, 1998, now abandoned.

(51) Int. Cl.$^7$ .............................. C08J 3/28; C08F 255/02; C08F 255/00; C08F 259/08
(52) U.S. Cl. ................................ 522/79; 522/84; 522/85; 522/114; 522/116; 522/117; 522/120; 522/124; 522/125; 521/27; 525/243
(58) Field of Search ..................................... 522/114, 120, 522/124, 125, 117, 116, 122, 85, 84, 80; 525/243; 521/27

(56) References Cited

U.S. PATENT DOCUMENTS

| | | |
|---|---|---|
| 1,498,990 | 6/1924 | Beyer . |
| 3,481,848 | 12/1969 | Gotohda et al. . |
| 4,012,303 | 3/1977 | D'Agostino et al. . |
| 4,201,641 | 5/1980 | Gotoda et al. . |
| 4,339,473 | 7/1982 | D'Agostino et al. . |
| 4,414,090 | 11/1983 | D'Agostino et al. . |
| 4,605,685 | 8/1986 | Momose et al. . |
| 4,675,090 | 6/1987 | Dagard et al. . |
| 5,047,446 | * 9/1991 | DeNicola, Jr. . |
| 5,164,424 | 11/1992 | Brueschke et al. . |
| 5,652,281 | * 7/1997 | Galli et al. . |
| 5,743,940 | 4/1998 | Sugo et al. . |

FOREIGN PATENT DOCUMENTS

| | | |
|---|---|---|
| 0526203 | 2/1993 | (EP) . |
| 856884 | 12/1960 | (GB) . |
| 1237293 | 6/1971 | (GB) . |
| 2082599 | 3/1982 | (GB) . |

OTHER PUBLICATIONS

Proton Exchange membranes by Radiation–induced Graft Copolymerization of Monomers into Teflon–FEP Films; B Gupta & G G Scherer, Chima 48 (1994) No. 5.

Properties of Radiation Grafted Membranes for Fuel Cell Applications O Haas, HP Beck, F N Buchi, B Gupta & G G Scherer, No. Ref.

Low Dose Gamma–irradiation on some fluorpolymers;: effect of polymer chemical structure Rosenburg, A Siegman, M Narkis & S Shkolnik.

Study of radiation–grafted FEP–g–polystyrene membranes as polymer electrolytes in fuel cells; F N Buchi, B Gupta, O Haas & G G Scherer; Electrochemica AActa vol. I. 40, No. 3 pp. 345–353, 1995.

Surface Nonhomogeneity in Radiation Grafted FEP–g–Polystyrenesulfonic acid Proton Exchange Membranes, B Gupta, M Staub & G G Scherer; Journal of Polymer Science: Part A: polymer Chemistry, vol. 33, 1545–1549 (1995).

Performance of Differently Cross–linked, Partially Fluorinated Proton Exchange Membranes in Polymer Electrolyte Fuel Cells; F N Buchi, B Gupta, O Haas & G G Scherer; J electrochem. Soc., vol .142, No. 9, 1995.

Polymer Membranes for Fuel Cells; G. G. Scherer, Ber. Busenges Phys, Chem. 94, 1008–1014 (1990).

Proton Exchange membranes prepared by simultaneous radiation grafting of styrene onto Teflon–FEP films; Synthesis and Characterization, M V. Rouilly, E R Kotz, O Haas, G G Scherer & A Chapiro; Journal of Membrane Science, 81 (1993) 89–95.

Radiation Chemistry of Polymeric Systems; Adolphe Chapiro, Interscience Publishers 1962 (Book–Contents only).

Radiation Processing of Polymers, A Singh & J Silverman; Hanser Publishers; (Book–Contents only).

* cited by examiner

Primary Examiner—Susan W. Berman
(74) Attorney, Agent, or Firm—Antonelli, Terry, Stout & Kraus, LLP

(57) ABSTRACT

A monomer-grafted cross-linked polymer is prepared by the steps of activating a polymer by radiation, quenching the activated polymer so as to effect cross-linking therein, activating the cross-linked polymer by irradiation and contacting the activated cross-linked polymer with an emulsion that includes an unsaturated monomer, an emulsifier and water. The activated cross-linked polymer is contacted with the emulsion for a sufficient time to effect a desired extent of grafting.

29 Claims, No Drawings

WATER BASED GRAFTING

This application is a continuation in part of application Ser. No. 09/153,458, filed Sep. 15, 1998, now abandoned.

The present invention relates to a process for the grafting of an unsaturated monomer to a polymer, in particular to a fluorinated polymer. In particular the present invention relates to a process for forming monomer-grafted cross-linked polymer membranes which may be used as non-ionic exchange membranes or ion-selective exchange membranes. These membranes can be used in various applications such as electrodialysis, dialysis, Donnan dialysis and energy systems such as batteries, redox cells and fuel cells. The present invention may also be applied to the preparation of grafted microporous cross-linked polymer structures. It may also be used to graft different form factors such as threads, non-woven fabrics, tubes, powders, pellets, sheets and/or films.

Techniques for the grafting of an unsaturated monomer to a polymer are described in U.S. Pat. Nos. 3,481,848, 4,012,303, 4,339,473, 4,605,685 and 5,743,940, EP Patent No. 0526203 and GB Patent No. 1237293. The techniques known in the art all involve the steps of activation of the polymer, i.e. the generation of free radicals on the polymer backbone, and reaction between the activated polymer and the unsaturated monomer to produce a monomer-grafted polymer. These steps may be carried out either simultaneously or sequentially. A review of the subject area is presented in a paper written by B. Gupta and G. G. Scherer, *Chimia* 48 (1994), 127–137.

U.S. Pat. No. 3,481,848 discloses a method of radiation graft polymerization of vinyl compounds onto cellulose in which cellulose is pre-irradiated in air then reacted with a vinyl monomer in an emulsified system and in which alumina or an alumina-silica mixture is used as a catalyst in order to deactivate OH radicals. Without the catalyst a large quantity of homopolymer is formed. The method is only applied to cellulose membranes and indeed would be unsuitable for many polymers, especially fluorinated polymers, which will undergo degradation and mechanical breakdown if irradiated in air.

U.S. Pat. No. 4,012,303 discloses a process for the simultaneous irradiation grafting of trifluorostyrene to an inert polymeric film base. In this case the polymer is activated by irradiation whilst immersed in an organic solution of the monomer. This process suffers from a number of disadvantages. Firstly, the monomer may undergo significant homopolymerization in preference to being grafted to the polymeric film base since it too is irradiated, and therefore activated, simultaneously with the polymeric film base. Secondly, the process utilises an organic solvent to solubilize the monomer and this is disadvantageous for environmental reasons. Thirdly, the process utilises gamma radiation which, because of its low energy density, requires long radiation times to achieve the required dose. Finally, the process is slow, requiring up to 400 hours to achieve graft levels of about 30%.

U.S. Pat. No. 4,339,473 also discloses a simultaneous radiation grafting process which uses water as the solvent and includes homo- and/or co-polymerisation retardants. Thus, the problem of homopolymerisation is reduced and the use of organic solvents is avoided. However this process is limited to grafting monomers which are hydrophilic, that is monomers which are substantially soluble in water.

U.S. Pat. No. 4,605,685 discloses a sequential process for the irradiation grafting of trifluorostyrene to an inert polymeric film base. This process involves activation of the polymeric film base by irradiation with beta radiation prior to contact with the monomer. If stored at sufficiently low temperatures, the activated polymeric film base may remain stable for up to two months. In this method the monomer solution is not exposed to radiation and this alleviates the problem of homopolymerization of the monomer. However it still retains the disadvantage of the use of organic solvents to solubilize the monomer and, although faster than the simultaneous grafting process of U.S. Pat. No. 4,012,303, it still requires lengthy reaction times for the grafting step, typically about 20 hours at 50 deg C. The reaction time may be lowered by the removal of the radical inhibitors which are commonly added to commercially available unsaturated monomers to increase their shelf life. However this is a costly and time-consuming process. Furthermore, the percentage graft, even at such long reaction times, is still only about 50% at most.

U.S. Pat. No. 5,743,940 also discloses a sequential process in which an organic high molecular weight compound is exposed to an ionising radiation and thereafter a polymerisable monomer that either contains ion exchange groups or a polymerisable monomer that can be converted to provide ion-exchange groups is incorporated in the irradiated compound by graft polymerization. The monomer may be incorporated by liquid- or vapour-phase graft polymerization but the former is presumably only possible in aqueous solution when the polymerisable monomer is water soluble.

GB-A-1237293 discloses the use of an emulsion of a monomer in water for grafting to a polymer by thermal polymerization. The process involves simultaneous thermal activation of the polymer and reaction with an emulsion of the monomer in water. Although the disclosure makes no mention of homopolymerization, it is highly likely to be a problem for such a process where the polymer and monomer are subjected to thermal activation at the same time. Presumably, in order to alleviate the problem of homopolymerization the process operates at very low concentrations of monomer resulting in only low levels of grafting.

EP-A-0526203 discloses a separation membrane composed of microporous polyethylene having fine pores substantially filled with a graft polymer. The membrane is obtained by bringing microporous polyethylene having radicals formed by plasma irradiation into contact with an emulsion comprising a water-insoluble monomer, a surface-active agent and water.

It is an object of the present invention to provide a process for cross-linking a polymer and grafting a monomer thereto which does not require the use of an organic solvent and which does not result in significant homopolymerization of the monomer but which provides a uniform graft of a monomer throughout a polymer within a reasonable reaction time at a low reaction temperature.

Cross-linking, also known in the art as "reticulation", generally improves the physical properties of the polymer. It creates a more tightly structured polymer which has a higher glass transition temperature and in which other physical properties such as tensile strength, refractive index, creep, compression set and stress relaxation are also improved. Improvements in such physical properties are particularly advantageous when the polymer is used to produce a thin film such as is required when forming an ion-exchange membrane. Cross-linking also generally reduces the chemical reactivity of the polymer because the tighter structure decreases the diffusion of chemical species throughout the polymer. It also decreases the ability of the polymer to swell when placed in a solvent which further improves its chemical resistance. Improvements in such chemical properties are particularly advantageous when the polymer is used to produce ion-exchange membranes. Such membranes must have high resistance to the chemical environments in which they are used, for example in electrochemical cells. However the alteration in the physical and chemical characteristics of the polymer, whilst advantageous for the reasons given above, would be expected to make the polymer more resistant to the grafting of other monomer species to the polymer.

Grafting processes known in the art do not effect cross-linking of the polymer and would not be expected to achieve the stated aims of a uniform graft of a monomer throughout a cross-linked polymer within a reasonable reaction time at a low reaction temperature because of the nature of such a polymer.

Thus the present invention provides a process for the preparation of a monomer-grafted cross-linked polymer comprising the steps of:

(i) activating the polymer by irradiation,
(ii) quenching the activated polymer so as to effect cross-linking therein,
(iii) activating the cross-linked polymer by irradiation,
(iv) contacting the activated cross-linked polymer with an emulsion which comprises
  (a) an unsaturated monomer,
  (b) an emulsifier, and
  (c) water,
  for a time sufficient to effect the desired extent of grafting.

The process of the present invention may be used to graft unsaturated monomers to a large number of polymers, copolymers or terpolymers formed from hydrocarbon, halogenated or perhalogenated (in particular fluorinated or perfluorinated) monomers. Preferably the polymer is selected from polyethylene (PE), polytetrafluoroethylene (PTFE) polyhexafluoropropylene (HFP), tetrafluoroethylene-hexafluoropropylene copolymer (FEP), tetrafluoroethylene-propylene copolymer, tetrafluoroethylene-ethylene copolymer (ETFE), hexafluoropropylene-propylene copolymer, hexafluoropropylene-ethylene copolymer, polyvinylidene fluoride (PVDF), vinylidene fluoride tetrafluoroethylene copolymer (PVDF-TFE), vinylidene fluoride hexafluoropropylene copolymer (PVDF-HFP or "Kynar-Flex"), polyvinyl fluoride, tetrafluoroethylene-perfluoroalkyl vinyl ether copolymer, polyvinylidene-hexafluoropropylene copolymer, chlorotrifluoroethylene-ethylene copolymer, chlorotrifluoroethylene-propylene copolymer, perfluoroalkoxy copolymer, polychloroethylene, polyvinyl fluoride, tetrafluoroethylene-perfluoroalkyl vinyl ether copolymer, or perfluoroalkoxy copolymer (PFA). Fluorinated or perfluorinated polymers, copolymers or terpolymers are particularly preferred.

Additionally, the present process may be applied to the grafting of unsaturated monomers to expanded microporous polymers such as expanded PTFE or PVDF.

The process of the present invention may be used to graft a large number of unsaturated hydrocarbon, halogenated and perhalogenated monomers. Preferably the unsaturated monomer is selected from styrene, trifluorostyrene, alphamethylstyrene, alpha, beta-dimethylstyrene, alpha, beta,beta-trimethylstyrene, ortho-methylstyrene, meta-methylstyrene, para-methylstyrene, divinylbenzene, triallylcyanurate, acrylic acid, methacrylic acid, vinylpyrrolidone, vinylpyridine, vinylacetate, trifluorovinylacetate, and methylvinyltoluene and mixtures thereof. It will be noted that some of these monomers are soluble in water, however, the use of an emulsifier as described in the present invention is still advantageous in these cases because it improves the wetting of the polymer.

Preferably, the monomer component of the emulsion is present in an amount of from 25 to 70% by weight. More preferably, the monomer component of the emulsion is present in an amount of from 40 to 60% by weight. Even more preferably, the monomer component of the emulsion is present in an amount of from 45 to 55% by weight.

The emulsifier used in the present invention is selected from alkyl sulfates, alkyl aromatic sulfonates, ethoxylated fatty alcohols, fatty acid esters and mixtures thereof. Preferably the emulsifier used is selected from Atlas 3969™ (produced by ICI) or Rhodasurf LA12™ (produced by Rhone Poulenc).

Preferably, the emulsifier component of the emulsion is present in an amount of from 1 to 15% by weight, based on the weight of the monomer. More preferably, the emulsifier component of the emulsion is present in an amount of from 5 to 10% by weight, based on the weight of the monomer. The use of a relatively high concentration of emulsifier improves the wetting of the polymer and also improves emulsion stability.

Preferably the emulsion additionally comprises a coupling agent, such as isopropyl alcohol, which stabilizes the emulsion and enhances wetting.

The emulsion is preferably sparged using nitrogen prior to its use in step (iii) of the process in order to remove oxygen from the mixture which would otherwise react with the radicals formed in the activated polymer to form peroxides. The emulsion produced by the present process is relatively stable which provides an economic advantage in that it can be re-used for numerous graftings. The lower the temperature at which the grafting step is conducted, the more often the emulsion can be re-used. When exhausted the emulsion can be conveniently disposed of by polymerizing the remaining monomer either thermally or by irradiation and filtering out the polymer.

The radiation for activation of the polymer may be provided by gamma rays, X rays, UV light, plasma irradiation or beta particles. Preferably, the radiation used is beta radiation. Beta radiation is preferred for a number of reasons. Firstly the source can be switched on and off as required and secondly, unlike gamma radiation, very high dose rates are possible.

It will be appreciated by those skilled in the art that the total radiation dose required for the second activation step (step (iii)) depends upon the identity of the base polymer and the bonds contained therein. However, the total radiation dose for the activation step (step iii) is preferably in the range of from 0.1 to 15 Mrad, more preferably from 1 to 10 Mrad. Even more preferably, the radiation dose for step (iii) is in the range of from 6 to 9 Mrad. Preferably, irradiation of the polymer in both steps (i) and (iii) takes place in an inert atmosphere such as nitrogen gas. The radiation dose can be varied to adjust the radical concentration within the polymer to any desired level, the percent graft being dependent upon the activation dose when all other parameters are constant. Thus step (iii) can be used to limit the extent of grafting and if necessary the polymer can be re-irradiated to create more radicals. The polymer will remain activated for up to approximately 2 months if stored at temperatures in the range of from −60 to 0 deg C. Consequently, the grafting step need not follow immediately after step (iii). The stability of activated polymers is discussed in U.S. Pat. No. 4,605,685.

Preferably, the grafting step (step (iv)) is carried out at a temperature of from 15 to 70° C., more preferably from 45 to 55° C. If other parameters are kept constant, then at lower temperatures the rate of grafting is slower. However, the rate of radical-radical coupling, which reduces the number of available sites for grafting, is also slower and the stability of the emulsion is greater. This leads to a higher overall percentage craft, albeit after a longer reaction time. Slower degradation of the emulsion also means that it can be re-used more often. At higher temperatures the rate of grafting is faster but so too is the rate of radical-radical coupling and the rate of degradation of the emulsion. This leads to a lower overall percentage graft.

The time over which the grafting step takes place may be varied depending upon the desired extent of grafting and on the identity of the polymer and unsaturated monomer involved. However, the grafting step is preferably carried out for a time period in the range of from 0.5 to 6 hours, more preferably 2 to 3 hours.

Preferably, the polymer is irradiated in step (i) to within the range of from 10 to 80 Mrad, more preferably 30 to 50 Mrad. Preferably, the polymer is quenched in step (ii) by heating in an oxygen free atmosphere, preferably nitrogen, for a time sufficient to effect cross-linking. In this case, the temperature for step (ii) may be in the range of from 50 to 100° C., and preferably approximately 80° C. The time-period for heating is preferably approximately 24 hours. In another embodiment, step (ii) may further involve the use of cross-linking agents. Cross-linking agents may comprise two or more vinyl groups and examples include divinylbenzene and triallyl cyanurate.

It has been found that the use of the present process provides high rates of grafting even for these cross-linked polymers. Methods known in the art must usually be practised on uncross-linked polymers because the rate of grafting is prohibitively slow for cross-linked polymers.

In another Preferred embodiment of the present invention nitrogen is continuously bubbled through the reaction mixture during the grafting step (step (iv)). This is particularly advantageous because the turbulence prevents layering of the emulsion and therefore results in a more uniform graft of the monomer to the polymer.

In another preferred embodiment of the present invention the pH of the emulsion is adjusted to a value in the range of from 6 to 10, more preferably from 7 to 10.

Preferably, the polymer is in the form of a membrane suitable for use as an ion-exchange membrane in an electrochemical cell. In the case where the monomer-grafted polymer is to be made suitable for use as a cation exchange membrane in an electrochemical cell the process preferably additionally comprises the step of sulfonating the monomer-grafted polymer. This provides a membrane which is selective to cations. Preferably, the sulfonation step comprises contacting the monomer-grafted polymer with a mixture of methylene chloride and chlorosulfonic acid.

The present invention is illustrated, but not limited, by the typical procedure described below:

A polymer film is cut to a suitable size and placed in a thin plastic bag. The bag is purged with nitrogen several times, then flattened and sealed. The film is irradiated to a dose of from 10 to 70 Mrad then heated to about 80° C. for 24 hours. The quenched film is again irradiated to provide the activation dose, typically from 1 to 10 Mrad. The film may then be stored at low temperature, typically from –60 to 0° C., or taken directly on to the grafting step. An emulsion of the monomer may typically be prepared by heating a suitable emulsifier, adding the monomer and slowly adding deionised water, the water preferably being at room temperature, from a squeeze bottle with rapid stirring. On a large scale a homogenizer such as an Eppenbach stirrer may be used to effect emulsification. A typical formula is 5% by weight emulsifier, 47.5% by weight monomer and 47.5% by weight water. The emulsion system is added to a test tube fitted with a ground glass stopper and a nitrogen inlet. The emulsion is sparged for at least two hours then warmed to the desired reaction temperature, typically from 15 to 70° C., in a constant temperature bath. When the emulsion reaches the desired temperature the activated film is inserted into the tube. A mesh is kept on the wall of the tube to prevent the film contacting the glass. After the desired reaction time, typically 0.5 to 6 hours, the film is removed, washed with water and dried to constant weight. The dried film may be sulfonated using a mixture of methylene chloride and chlorosulfonic acid, the chlorosulfonic acid typically being present in a range of from 3 to 5% by weight. The reaction time is about two hours and is best performed in a large sealed test tube. The film is removed, drip-dried and carefully added to cold water. Subsequently the film is heated to about 90° C. for about 2 hours to effect hydrolysis. The film may be treated with potassium hydroxide or an emulsifier to lower its resistance. The film is then equilibrated in 0.6 N potassium chloride overnight at about 25° C.

The present invention will now be described with reference to the following specific examples and comparative examples. In the examples the extent of monomer graft to the polymer is expressed by the percentage graft which is calculated using the formula:

Percentage graf=$(F_w-I_w)/I_w \times 100$ $I_w$=nitial Weight of Polymer $F_w$=Final Weight of Polymer

COMPARATIVE EXAMPLES 1 to 3

Three films; ETFE, 50 μm thick, PVDF 50 μm thick and Kynar-Flex (PVDF-HFD copolymer) 85 μm thick, were cut to 7.6 cm×10.2 cm and sealed in polyethylene bags. These were irradiated to 9 Mrad (3 passes at 3 Mrad per pass, the films being reversed after each pass). The films were then removed from the bag and immersed in a 7.6 cm long flat-bottom test tube filled with a styrene/toluene mixture (40/60) v/v, which was preheated to 60° C. and sparged with nitrogen for 2 hours. The films were separated by Nalgene™ mesh and Nalgene™ mesh was placed on the inner wall of the test tube. The reaction time was 17 hours. The films were removed, dried in air, then heated at 80° C. in an oven for 10 minutes. The percentage grafts were:

| 1. ETFE | 57% |
| 2. PVDF | 82% |
| 3. Kynar-flex | 17.5% |

EXAMPLES 4 and 5

A monomer emulsion was prepared by weighing an emulsifier (30.1 gm of Atlas 3969™) into a suitable container and heating gently until the emulsifier just melted. Styrene (301.2 gm) was added and the two components were mixed throughly. De-ionised water (334.7 gm) was added from a squirt bottle slowly with stirring. Two films; ETFE 50 μm thick and Kynar-Flex 85 μm thick were cut to 7.6 cm×10.2 cm and sealed in polyethylene bags. They were irradiated to 30 Mrad and quenched at 80° C. in nitrogen. They were then irradiated to 9 Mrad (3 passes at 3 Mrad per pass, the films being reversed after each pass). The monomer emulsion prepared above was heated to 60° C. and sparged with nitrogen for two hours. The films were then immersed in a 7.6 cm flat-bottom test tube filled with the emulsion. The reaction was continued at 60° C. for 4 hours with nitrogen sparging. The films were washed with de-ionised water and dried. The percentage grafts were:

| 4. ETFE | 108% |
|---|---|
| 5. Kynar-Flex | 78.8% |

The distribution of monomer on the grafted films was very uniform.

EXAMPLES 6 and 7

Two films; ETFE and Kynar-Flex were cross-linked and grafted under identical conditions as given in Examples 4 and 5 above except that the time was reduced to 1 hour. The percentage grafts were:

| 6. ETFE | 108% |
|---|---|
| 7. Kynar-Flex | 59.5% |

The distribution of monomer on the granted films were very uniform.

EXAMPLE 8

A piece of ETFE film, 15.2 cm×10.2 cm and 50 $\mu$m thick was irradiated to 30 Mrad and quenched at 80° C. in nitrogen. It was then irradiated to 9 Mrad and immersed in emulsion (prepared as described in examples 4 and 5) at 50° C. for 1 hour giving a graft yield of 37%. The resistance of the film was measured as 0.302 ohms/cm$^2$ in 0.6 N KCl solution at 25° C. and 1 kHz AC.

EXAMPLE 9

The method of example 8 was repeated using a graft time of 4 hours instead of 1 hour giving a graft yield of 159%. The resistance of the film was measured as 0.120 ohms/cm$^2$ in 0.6 N KCl solution at 25° C. and 1 kHz AC.

EXAMPLES 10 to 29

Three different monomer emulsions were prepared using the following components (in wt %):

| Emulsion 1: | |
|---|---|
| Styrene | 47.25 |
| Atlas 3969 | 5.50 |
| Water | 47.25 |
| Emulsion 2: | |
| Styrene | 39.96 |
| Divinylbenzene | 4.44 |
| Triallyl Cyanurate | 3.60 |
| Atlas 3969 | 5.5 |
| Water | 46.5 |
| Emulsion 3: | |
| Styrene | 43.00 |
| Divinylbenzene | 2.75 |
| Triallyl Cyanurate | 2.25 |
| Atlas 3969 | 5.5 |
| Water | 46.5 |

Films of ETFE and Kynar Flex (KF) were cross-linked and grafted according to the conditions given in the tables below:

| Example | 10 | 11 | 12 | 13 | 14 | 15 | 16 |
|---|---|---|---|---|---|---|---|
| Film type | KF | KF | KF | ETFE | ETFE | KF | KF |
| Thickness of film ($\mu$m) | 8.9 | 8.9 | 8.9 | 5.1 | 5.1 | 8.9 | 8.9 |
| Film size (cm × cm) | 13x10 | 13x10 | 13x10 | 13x10 | 13x10 | 13x10 | 13x10 |
| Activation dose for step (i) (Mrad) | 30 | 50 | 70 | 30 | 50 | 30 | 30 |
| Activation dose for step (iii) (Mrad) | 9 | 9 | 9 | 9 | 9 | 9 | 9 |
| Emulsion formulation | 1 | 1 | 1 | 1 | 1 | 1 | 1 |
| Temperature of step (iv) (° C.) | 60 | 60 | 60 | 60 | 60 | 50 | 50 |
| Time for step (iv) (Hrs) | 1 | 1 | 1 | 1 | 1 | 1 | 2 |
| % Graft | 67 | 67 | 58 | 72 | 68 | 78 | 91 |

-continued

| Example | 17 | 18 | 19 | 20 | 21 | 22 | 23 |
|---|---|---|---|---|---|---|---|
| Film type | KF | KF | ETFE | ETFE | ETFE | ETFE | KF |
| Thickness of film ($\mu$m) | 8.9 | 8.9 | 5.1 | 5.1 | 5.1 | 5.1 | 8.9 |
| Film size (cm × cm) | 13x10 | 13x10 | 13x10 | 13x10 | 13x10 | 13x10 | 13x10 |
| Activation dose for step (i) (Mrad) | 30 | 70 | 30 | 30 | 30 | 30 | 30 |
| Activation dose for step (iii) (Mrad) | 9 | 9 | 6 | 6 | 6 | 9 | 9 |
| Emulsion formulation | 1 | 1 | 1 | 1 | 1 | 2 | 2 |
| Temperature of step (iv) (° C.) | 50 | 50 | 55 | 55 | 55 | 50 | 50 |
| Time for step (iv) (Hrs) | 3 | 1 | 2 | 1 | 0.5 | 16 | 2 |
| % Graft | 114 | 87 | 150 | 100 | 40 | 181 | 15 |

| Example | 24 | 25 | 26 | 27 | 28 | 29 |
|---|---|---|---|---|---|---|
| Film type | KF | KF | KF | KF | KF | KF |
| Thickness of film ($\mu$m) | 8.9 | 8.9 | 8.9 | 8.9 | 8.9 | 8.9 |
| Film size (cm × cm) | 13x10 | 13x10 | 13x10 | 13x10 | 13x10 | 13x10 |
| Activation dose for step (i) (Mrad) | 30 | 30 | 30 | 30 | 30 | 30 |
| Activation dose for step (iii) (Mrad) | 6 | 9 | 9 | 9 | 9 | 9 |
| Emulsion formulation | 2 | 2 | 3 | 3 | 2 | 2 |
| Temperature of step (iv) (° C.) | 50 | 50 | 50 | 50 | 50 | 50 |
| Time for step (iv) (Hrs) | 3 | 5.5 | 2 | 2 | 2 | 2 |
| % Graft | 33 | 40 | 24 | 25 | 48 | 37 |

The present invention as described above provides a process for the preparation of a monomer-grafted cross-linked polymer which has a number of significant advantages. The process provides high percentage grafts in a much shorter reaction time and at lower reaction temperatures than conventional processes which use an organic solvent even though the polymer is cross-linked and even with hydrophobic polymers such as the preferred fluorinated polymers. The high speed of the reaction enables grafting to cross-linked polymers which usually react too slowly to be viable. As well as obvious cost savings, the speed of the grafting reaction and the low temperature at which it may be performed consequently confer a number of advantages on the process. The use of low temperatures alleviates the problem of homopolymerization due to thermal activation. At a reaction temperature of 40 to 45° C. no homopolymer is evident in the grafting emulsion or grafted polymer even after 4 or 5 graft cycles using the same monomer emulsion. Cross-linking monomers, for example divinylbenzene and triallylcyanurate, can also be added to the emulsion without causing gelation. It also allows the process to be performed in a continuous manufacturing line rather than in batches. The low temperature and short reaction time combined with the stability of the emulsion allow for a continuous grafting process on a pre-irradiated film providing low cost manufacturing possibilities. The present process provides extremely high quality cross-linked and grafted polymers in terms of the uniformity of the graft throughout the polymer. The use of the post-irradiation grafting technique eliminates homopolymerization due to irradiation of the monomer. The elimination of homopolymerization allows the use of high concentrations of monomers and/or difunctional monomers. The water present in the emulsion is advantageous in moderating the heat of reaction due to its high specific heat capacity. This reduces the need to cool the reaction. It is believed that the radical inhibitors present in the commercially available monomers are partitioned into the water phase. This obviates the need for the removal of radical inhibitors prior to grafting. The emulsion is stable and may be re-used a number of times decreasing the waste per unit of production. The extent of re-use is dependent upon the reaction time and the reaction temperature for the grafting step. The stability of the emulsion allows it to be stored at room temperature, the volatility and toxicity of the organic solvents used in known processes makes storage of monomer solutions problematic. Waste emulsion can be conveniently disposed of by heating with an initiator to polymerize the remaining monomer. This can be filtered, heated further to ensure complete elimination of the monomer and discarded. A further benefit is that no organic solvent is required. This provides advantages in terms of cost, safety and the environment. By cross-linking the polymer prior to grafting the process further provides polymers with advantageous physical and chemical properties, these properties being especially favoured when the polymer is used to form ion-exchange membranes.

What is claimed is:

1. A process for the preparation of a monomer-grafted cross-linked polymer comprising the steps of:
   (i) activating the polymer by irradiation,
   (ii) quenching the activated polymer so as to effect cross-linking therein,
   (iii) activating the cross-linked polymer by irradiation,
   (iv) contacting the activated cross-linked polymer with an emulsion which comprises
      (a) an unsaturated monomer,
      (b) an emulsifier, and
      (c) water,
      for a time sufficient to effect the desired extent of grafting.

2. A process according to claim 1 wherein the polymer is selected from the group consisting of fluorinated and perfluorinated polymers, copolymers and terpolymers.

3. A process according to claim 1 wherein the polymer is selected from the group consisting of polyethylene, polytetrafluoroethylene, polyhexafluoropropylene, tetrafluoroethylene-hexafluoropropylene copolymer, tetrafluoroethylene-propylene copolymer, tetrafluoroethylene-ethylene copolymer, hexafluoropropylene-propylene copolymer, hexafluoropropylene-ethylene copolymer, polyvinylidene fluoride, vinylidene fluoride tetrafluoroethylene copolymer, vinylidene fluoride hexafluoropropylene copolymer, polyvinyl fluoride, tetrafluoroethylene-perfluoroalkyl vinyl ether copolymer, polyvinylidene-hexafluoropropylene copolymer, chlorotrifluoroethylene-ethylene copolymer, chlorotrifluoroethylene-propylene copolymer, perfluoroalkoxy copolymer, polychloroethylene, polyvinyl fluoride, tetrafluoroethylene-perfluoroalkyl vinyl ether copolymer, and perfluoroalkoxy copolymer.

4. A process according to claim 1 wherein the unsaturated monomer is selected from the group consisting of styrene, trifluorostyrene, alphamethylstyrene, alpha,beta-dimethylstyrene, alpha,beta,beta-trimethylstyrene, ortho-methylstyrene, meta-methylstyrene, para-methylstyrene, divinylbenzene, triallylcyanurate, acrylic acid, methacrylic acid, vinylpyrrolidone, vinylpyridine, vinylacetate, trifluorovinylacetate, and methylvinyltoluene, and mixtures thereof.

5. A process according to claim 1 wherein the monomer component of the emulsion is present in an amount of from 25 to 70% by weight.

6. A process according to claim 1 wherein the monomer component of the emulsion is present in an amount of from 40 to 60% by weight.

7. A process according to claim 1 wherein the monomer component of the emulsion is present in an amount of from 45 to 55% by weight.

8. A process according to claim 1 wherein the emulsifier is selected from alkyl sulfates, alkyl aromatic sulfonates, ethoxylated fatty alcohols, fatty acid esters or mixtures thereof.

9. A process according to claim 1 wherein the emulsifier component of the emulsion is present in an amount of from 1 to 15% by weight, based on the weight of the monomer.

10. A process according to claim 1 wherein the emulsifier component of the emulsion is present in an amount of from 5 to 10% by weight, based on the weight of the monomer.

11. A process according to claim 1 wherein the emulsion is prepared by a process which comprises the steps of:
   (a) heating the emulsifier until it just melts,
   (b) adding the monomer,
   (c) adding the water with stirring.

12. A process according to claim 1 wherein the emulsion additionally comprises isopropyl alcohol.

13. A process according to claim 1 wherein the total radiation dose for step (iii) is in the range of from 1 to 10 Mrad.

14. A process according to claim 1 wherein the total radiation dose for step (iii) is in the range of from 6 to 9 Mrad.

15. A process according to claim 1 wherein the radiation for steps (i) and (iii) is provided by gamma rays, X rays, ultraviolet radiation, plasma irradiation or beta particles.

16. A process according to claim 1 wherein step (iv) is carried out at a temperature in the range of from 15 to 70° C.

17. A process according to claim 1 wherein step (iv) is carried out at a temperature in the range of from 45 to 55° C.

18. A process according to claim 1 wherein step (iv) is carried out for a time period in the range of from 0.5 to 6 hours.

19. A process according to claim 1 wherein step (iv) is carried out for a time period in the range of from 2 to 3 hours.

20. A process according to claim 1 wherein the total radiation dose for step (i) is in the range of from 10 to 80 Mrad.

21. A process according to claim 1 wherein step (ii) comprises heating in an oxygen free atmosphere.

22. A process according to claim 1 wherein step (ii) comprises adding one or more cross-linking agents.

23. A process according to claim 21 wherein the one or more cross-linking agents are selected from divinylbenzene and triallyl cyanurate.

24. A process according to claim 1 wherein nitrogen is continuously bubbled through the reaction mixture during step (iii).

25. A process according to claim 1 additionally comprising the step of sulfonating the monomer-grafted cross-linked polymer.

26. A process according to claim 25 wherein the sulfonation step comprises contacting the monomer-grafted cross-linked polymer with a mixture of methylene chloride and chlorosulfonic acid.

27. A process as claimed in claim 1 wherein the polymer is in the form of a membrane suitable for use in an electrochemical cell.

28. A process as claimed in claim 1 wherein the polymer is an expanded microporous polymer structure.

29. A process as claimed in claim 1 wherein the polymer is in a form selected from the group consisting of threads, non-woven fabrics, tubes, powders, pellets, sheets and films.

* * * * *